United States Patent
Mukai et al.

(10) Patent No.: US 10,000,038 B2
(45) Date of Patent: *Jun. 19, 2018

(54) ALLOY PLATE COATED MATERIAL AND METHOD OF PRODUCING ALLOY PLATE COATED MATERIAL

(71) Applicant: TOYO KOHAN CO., LTD., Tokyo (JP)

(72) Inventors: Nobuaki Mukai, Yamaguchi (JP); Tomoyuki Tsuruda, Yamaguchi (JP); Takahiro Yoshida, Yamaguchi (JP)

(73) Assignee: TOYO KOHAN CO., LTD., Tokyo (JP)

(*) Notice: Subject to any disclaimer, the term of this patent is extended or adjusted under 35 U.S.C. 154(b) by 0 days. days.

This patent is subject to a terminal disclaimer.

(21) Appl. No.: 15/032,109

(22) PCT Filed: Oct. 27, 2014

(86) PCT No.: PCT/JP2014/078475
§ 371 (c)(1),
(2) Date: Apr. 26, 2016

(87) PCT Pub. No.: WO2015/064529
PCT Pub. Date: May 7, 2015

(65) Prior Publication Data
US 2016/0263862 A1  Sep. 15, 2016

(30) Foreign Application Priority Data

Oct. 28, 2013 (JP) .................................. 2013-223045

(51) Int. Cl.
*B32B 15/00* (2006.01)
*B32B 15/01* (2006.01)
(Continued)

(52) U.S. Cl.
CPC ............ *B32B 15/015* (2013.01); *C23C 18/50* (2013.01); *C23C 22/50* (2013.01); *C23C 22/83* (2013.01);
(Continued)

(58) Field of Classification Search
None
See application file for complete search history.

(56) References Cited

U.S. PATENT DOCUMENTS 3,754,939 A * 8/1973 Pearlstein ............... C23C 18/48
106/1.22
4,804,410 A    2/1989 Haga et al.
(Continued)

FOREIGN PATENT DOCUMENTS

CN    1388839 A    1/2003
EP    1314794 A1    5/2003
(Continued)

OTHER PUBLICATIONS

Schwarz et al., Bulk Metallic Glass Formation in The Pd-Ni-P and Pd-Cu-P Alloy Systems, Jun. 1997, Proceedings of the First International Alloy Conference, pp. 1-18.*
(Continued)

*Primary Examiner* — Seth Dumbris
(74) *Attorney, Agent, or Firm* — Muncy, Geissler, Olds & Lowe, P.C.

(57) ABSTRACT

Provided is an alloy plate coated material including a base material, and an alloy plate layer which is formed on the base material to constitute an outermost layer and is formed from a M1-M2-M3 alloy (provided that M1 is at least one element selected from Ni, Fe, Co, Cu, Zn and Sn; M2 is at least one element selected from Pd, Re, Pt, Rh, Ag and Ru;

(Continued)

and M3 is at least one element selected from P and B), in which the alloy plate layer has a molar ratio of M1 to M2 (M1/M2) of 0.005 to 0.5.

7 Claims, 9 Drawing Sheets

(51) Int. Cl.
| | |
|---|---|
| *C23C 18/50* | (2006.01) |
| *H01M 8/0208* | (2016.01) |
| *H01M 8/0228* | (2016.01) |
| *C23C 22/50* | (2006.01) |
| *C23C 22/83* | (2006.01) |
| *C23C 28/00* | (2006.01) |
| *H01M 8/1018* | (2016.01) |

(52) U.S. Cl.
CPC ........... *C23C 28/34* (2013.01); *H01M 8/0208* (2013.01); *H01M 8/0228* (2013.01); *H01M 2008/1095* (2013.01); *Y10T 428/12861* (2015.01)

(56) References Cited

U.S. PATENT DOCUMENTS 6,886,403 B2 * 5/2005 LaBarge ............... G01F 23/363 73/304 C
2003/0008168 A1 * 1/2003 Shibuya ............... A44C 27/006 428/670
2005/0242454 A1 * 11/2005 Yuasa ................... B29C 33/424 264/2.5
2010/0098967 A1 * 4/2010 Schroers ................. C22C 45/00 428/600
2011/0250522 A1 * 10/2011 Kaminaka ............... C22C 38/40 429/479

FOREIGN PATENT DOCUMENTS

| JP | 2-59871 B2 | 12/1990 |
| JP | 2011-249247 A | 12/2011 |
| WO | WO2014-010662 A1 | 1/2014 |

OTHER PUBLICATIONS

Okinaka et al., "Chapter 16 Electroless Plating of Platinum Group Metals," Cambridge University Press, Jan. 1990, pp. 421-440.
Pearlstein et al., "Electroless Palladium Deposition," American Electroplaters Society, Inc., vol. 56, No. 10, Jan. 1969, pp. 1158-1161.
Database WPI, Thomson Scientific, London, XP002767566, Mar. 21, 2008, 2 pages.
European Office Action in application No. 16.TKO.13187 dated Nov. 12, 2017, pp. 1-4.

* cited by examiner

ALLOY PLATE COATED MATERIAL AND METHOD OF PRODUCING ALLOY PLATE COATED MATERIAL

BACKGROUND OF THE INVENTION

1. Technical Field of the Invention

The present invention relates to an alloy plate coated material and a method of producing an alloy plate coated material.

2. Description of the Related Art

Conventionally, as an electrical contact material used in connectors, switches, printed wiring boards and the like, a member having an alloy plate layer for enhancing corrosion resistance and electrical conductivity formed on the surface of a base material, has been used.

Regarding such a member having an alloy plate layer formed on the surface of a base material, for example, Patent Document 1 (Japanese Patent Application Publication No. 2011-249247) discloses an alloy plate coated material configured such that an amorphous alloy plate layer formed from an amorphous alloy composed of predetermined elements is formed on a base material.

SUMMARY OF THE INVENTION

However, in the alloy plate coated material disclosed in Patent Document 1 described above, there is a problem that the amorphous alloy plate layer composed of predetermined elements has excellent corrosion resistance but has insufficient electrical conductivity, so that satisfactory characteristics as an electrical contact material are not obtained.

The invention was reported under such circumstances, and it is an object to provide an alloy plate coated material having excellent electrical conductivity in addition to corrosion resistance.

The present inventors conducted a thorough investigation so as to achieve the object described above, and as a result, the present inventors found that in regard to an alloy plate layer formed as an outermost layer on a base material, when an alloy plate layer in which the mixing ratio of the particular elements that constitute the alloy is in a predetermined range is used, the object described above can be achieved. Thus, the present inventors completed the invention.

Furthermore, the present inventors found that in a case in which the mixing ratio of the particular elements that constitute the alloy is not in the predetermined range, corrosion resistance of the amorphous alloy plate layer is deteriorated. For example, in a case in which the alloy plate layer is used for a long time period in a corrosive atmosphere as in the case of a fuel cell member, there is a risk that metals that have liquated over time may adversely affect the power generation characteristics of the fuel cell. Therefore, there is a demand for a plate coated material having both corrosion resistance and electrical conductivity.

That is, according to the invention, there is provided an alloy plate coated material including a base material; and an alloy plate layer which is formed on the base material to constitute an outermost layer and is formed from a M1-M2-M3 alloy (provided that M1 is at least one element selected from Ni, Fe, Co, Cu, Zn and Sn; M2 is at least one element selected from Pd, Re, Pt, Rh, Ag and Ru; and M3 is at least one element selected from P and B), in which the alloy plate layer is a plated layer having a molar ratio of M1 to M2 (M1/M2) of 0.005 to 0.5.

In regard to the alloy plate coated material of the invention, it is preferable that the alloy plate layer has a glass transition point.

In regard to the alloy plate coated material of the invention, it is preferable that the alloy plate layer is amorphous-like.

In regard to the alloy plate coated material of the invention, it is preferable that when the alloy plate layer is analyzed by a grazing incidence X-ray diffraction method using an X-ray diffractometer, the diffraction profile has a shape which has no sharp peaks originating from crystals containing at least one element selected from among M1, M2 and M3, and/or a shape which has a halo originating from an amorphous structure.

Furthermore, according to the invention, there is provided a method of producing an alloy plate coated material, the method including a step of forming, by electroless plating, an alloy plate layer formed from a M1-M2-M3 alloy (provided that M1 is at least one element selected from Ni, Fe, Co, Cu, Zn and Sn; M2 is at least one element selected from Pd, Re, Pt, Rh, Ag and Ru; and M3 is at least one element selected from P and B) on a base material so as to constitute an outermost layer, in which the alloy plate layer has a molar ratio of M1 to M2 (M1/M2) is 0.005 to 0.5.

Effect of Invention

According to the invention, an alloy plate coated material having excellent electrical conductivity in addition to corrosion resistance can be provided.

DESCRIPTION OF THE PREFERRED EMBODIMENT

Hereinafter, the alloy plate coated material 100 of the present embodiment will be explained.

Figure 1:
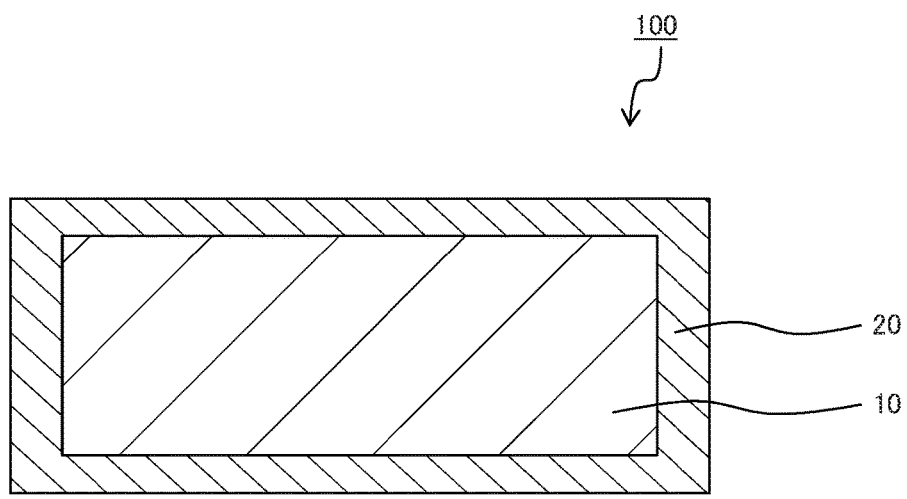
FIG. 1 is a diagram illustrating the configuration of an alloy plate coated material 100 related to the present embodiment.

As illustrated in FIG. 1, the alloy plate coated material 100 of the present embodiment includes, on a base material 10, an alloy plate layer 20 which is formed from a M1-M2-M3 alloy (provided that M1 is at least one element selected from Ni, Fe, Co, Cu, Zn and Sn; M2 is at least one element selected from Pd, Re, Pt, Rh, Ag and Ru; and M3 is at least one element selected from P and B) and constitutes the outermost layer. In the present embodiment, the alloy plate layer 20 is a plated layer in which the molar ratio of M1 to M2 (M1/M2) is 0.005 to 0.5.

The base material 10 is not particularly limited. Examples of the base material 10 include steel, stainless steel, Al, Al alloy, Ti, Ti alloy, Cu, Cu alloy, Ni, and Ni alloy. In particular, it is preferred to use stainless steel.

The stainless steel sheet is not particularly limited. Examples of the stainless steel sheet include those made of stainless steel material, such as SUS316, SUS316L and SUS304. Various types of stainless steel sheets may be mentioned, such as martensite-based, ferrite-based and austenite-based ones, among which austenite-based stainless steel sheets may be preferred.

Furthermore, it is preferable that a predetermined passivation film is formed on the surface of the stainless steel sheet. Regarding the predetermined passivation film, a passivation film in which the Cr/O value (molar ratio of Cr/O) and the Cr/Fe value (molar ratio of Cr/Fe) measured at the surface of the passivation film by an Auger electron spectroscopy analysis are in the following ranges. That is, the Cr/O value is preferably in the range of 0.09 to 0.20. Furthermore, the Cr/Fe value is preferably in the range of 0.55 to 0.80.

According to the present embodiment, when the Cr/O value and the Cr/Fe value at the surface of the passivation film formed on the stainless steel sheet used as the base material 10, as measured by an Auger electron spectroscopy analysis, is controlled to the ranges described above, the alloy plate coated material 100 thus obtainable has excellent corrosion resistance and electrical conductivity.

In the present embodiment, the Cr/O value and Cr/Fe value can be measured by Auger electron spectroscopy analysis using the method below. First, a scanning-type Auger electron spectroscopy analyzer (AES) is used to measure the surface of the passivation film of the stainless steel, and the atomic percentages of Cr, O, and Fe at the surface of the passivation film are calculated. Five locations at the surface of the passivation film are measured using a scanning-type Auger electron spectroscopy analyzer, and the obtained results may be averaged thereby to calculate the Cr/O value (at % of Cr/at % of O) and the Cr/Fe value (at % of Cr/at % of Fe). For example, among the obtained peaks by the measurement using a field emission Auger microprobe, a peak given at 510 to 535 eV represents the peak of Cr, a peak given at 485 to 520 eV represents the peak of O, and a peak given at 570 to 600 eV represents the peak of Fe. The atomic percentages of Cr, O, and Fe are to be measured when the sum of Cr, O, and Fe is 100 at %.

In the present embodiment, the method of forming the passivation film at the surface of the stainless steel sheet 10 is not particularly limited. Examples of the method include a method of immersing a stainless steel material, such as SUS316L as described above, which constitutes the stainless steel sheet 10, into a sulfuric acid aqueous solution.

When a stainless steel material is immersed in a sulfuric acid aqueous solution to form the passivation film, the sulfuric acid concentration in the sulfuric acid aqueous solution may preferably be 20 to 25 vol %. The temperature when immersing the stainless steel material may preferably be 50° C. to 70° C., and more preferably 60° C. to 70° C. The time for the stainless steel material to be immersed in the sulfuric acid aqueous solution may preferably be 5 to 600 seconds, and more preferably 5 to 300 seconds.

The shape and form of the stainless steel sheet 10 are not particularly limited, and may be appropriately selected depending on the use. For example, the stainless steel sheet 10 may be used after being worked into a necessary shape or form depending on its use, such as a conductive metal component worked into a linear form or a plate or sheet-like form, a conductive member obtained by working a plate or sheet into an irregular form, and an electronic device component worked into a spring-like or tubular form. The thickness (such as diameter and sheet or plate thickness) of the stainless steel sheet 10 is also not particularly limited, and may be appropriately selected depending on the use.

In the present embodiment, the alloy plate coated material 100 can be used as a separator for fuel cells. Such a separator for fuel cells is used as a member of a fuel cell that constitutes a fuel cell stack, and has a function to supply an electrode with fuel gas or air through gas flow channels and a function to collect electrons generated at the electrode. When the alloy plate coated material 100 is used as a separator for fuel cells, the surface of the base material 10 to be used may be preliminarily formed with irregularities (gas flow channels) that function as flow channels for fuel gas or air. The method of forming such gas flow channels is not particularly limited, but a method of forming the gas flow channels by press working may be mentioned, for example.

Alloy Plate Layer 20

The alloy plate layer 20 is a plated layer formed as the outermost layer in order to enhance the corrosion resistance and abrasion resistance of the alloy plate coated material 100 and to impart electrical conductivity. The alloy plate layer 20 is formed from a M1-M2-M3 alloy (provided that M1 is at least one element selected from Ni, Fe, Co, Cu, Zn and Sn; M2 is at least one element selected from Pd, Re, Pt, Rh, Ag and Ru; and M3 is at least one element selected from P and B), and the molar ratio of M1 to M2 (M1/M2) is 0.005 to 0.5.

Meanwhile, the method for forming the alloy plate layer 20 is not particularly limited, and can be formed by electrolytic plating, electroless plating, sputtering or the like. However, as will be described below, it is preferable that the alloy plate layer 20 is formed by electroless plating.

M1 in the M1-M2-M3 alloy is at least one element selected from Ni, Fe, Co, Cu, Zn and Sn. One element may be solely used, or two or more elements may be used in combination, such as in Ni—Fe, Ni—Co and Ni—Cu. Each element that constitutes M1 is an element having a property capable of independently forming a plated layer on the base material 10. In view of preventing the plating liquid from self-decomposition and enhancing the stability of the plating liquid, it is preferred to use at least one element selected from Ni and Co as M1, and particularly preferred is to use Ni.

M2 in the M1-M2-M3 alloy is at least one element selected from Pd, Re, Pt, Rh, Ag and Ru. One element may be solely used, or two or more elements may be used in combination. Each element that constitutes M2 is an element acting as a catalyst for the reaction of a reductant in the plating bath when deposited on the base material 10, i.e., has an action to continuously progress the metal deposition reaction. In view of keeping low cost, it is preferred to use at least one element selected from Pd and Ag as M2, and particularly preferred is to use Pd.

M3 in the M1-M2-M3 alloy is at least either one element selected from P and B. One element may be solely used, or these elements may be used in combination, as P—B. Each element that constitutes M3 is a metalloid that constitutes a reductant in the plating bath for forming the alloy plate layer 20, and will be unavoidably included into the alloy plate layer 20 in general when the alloy plate layer 20 is formed. In view of preventing the plating liquid from self-decomposition and enhancing the stability of the plating liquid, it is preferred to use P as M3.

The ratio of each element in the M1-M2-M3 alloy may preferably be such that M1 is 15 to 65 at %, M2 is 20 to 60 at %, and M3 is 15 to 40 at %, and more preferably such that M1 is 20 to 50 at %, M2 is 30 to 50 at %, and M3 is 20 to 30 at %. Furthermore, in regard to the alloy plate coated material 100, a small amount of unavoidable impurities may be included in the M1-M2-M3 alloy, to the extent that corrosion resistance and abrasion resistance are not significantly deteriorated. Examples of such unavoidable impurities include a heavy metal, such as Pb, Tl and Bi, which is added as a stabilizer that prevents the plating liquid from self-decomposition and stabilizes the plating liquid. In view of reducing the environmental load, Bi may preferably be used as the stabilizer. When the composition ratio of the M1-M2-M3 alloy is adjusted to the range described above, the alloy plate layer 20 can be satisfactorily formed on the base material 10, and thus the alloy plate coated material 100 can have excellent corrosion resistance and abrasion resistance.

Respective elements of the M1-M2-M3 alloy may be arbitrarily combined to be used. In view of preventing the plating liquid from self-decomposition and enhancing the stability of the plating liquid, Ni—Pd—P alloy, Ni—Pt—P alloy, Co—Pd—P alloy and Co—Ag—P alloy are preferred, and Ni—Pd—P alloy is particularly preferred.

While the method of forming the alloy plate layer 20 of the M1-M2-M3 alloy is not particularly limited as described above, when a method of formation by electroless plating is employed, there may be used a plating bath which contains elements represented by M1, M2 and M3 and to which a reductant and a complexing agent are added (underlying alloy electroless plating bath).

For example, when forming the alloy plate layer 20 of Ni—Pd—P alloy, the electroless alloy plating bath to be used can be obtained by mixing a nickel plating bath and a palladium plating bath which are ordinarily used. Examples of the nickel plating bath include a plating bath that contains: a nickel salt such as nickel chloride, nickel sulfate, nickel nitrate and nickel acetate; a phosphorus-containing reductant such as hypophosphite; and a complexing agent such as citric acid. Examples of the palladium plating bath include a plating bath that contains: a palladium salt such as palladium chloride; a phosphorus-containing reductant such as hypophosphite and phosphite; a reducing agent such as formic acid; and a complexing agent such as thiodiglycolic acid.

Meanwhile, on the occasion of producing an alloy electroless plating bath by mixing a nickel plating bath and a palladium plating bath, it is preferable to use nickel chloride, nickel sulfate or the like as the nickel salt, and to use palladium chloride or the like as the palladium salt. In regard to the mixing ratio between the nickel plating bath and the palladium plating bath, the molar ratio of Ni atoms and Pd atoms in the alloy electroless plating bath is such that the proportion Ni:Pd (molar ratio) is 0.62:1.0 to 3.32:1.0, preferably 0.88:1.0 to 2.68:1.0, and more preferably 0.88:1.0 to 2.14:1.0. Thereby, according to the present embodiment, the alloy plate layer 20 formed from a Ni—Pd—P alloy thus obtainable is produced into an amorphous-like configuration, and corrosion resistance and electrical conductivity can all be enhanced.

Meanwhile, in the present embodiment, the amorphous-like structure for the alloy plate layer 20 represents a structure that is substantially constituted of an amorphous (non-crystalline) form of a M1-M2-M3 alloy, and refers to a structure which may contain a slight amount of crystals of the M1-M2-M3 alloy. Such crystals may have a crystal structure that is unavoidably formed in the alloy plate layer 20 by the influence of the impurities included into the alloy plate layer 20 during the course in which the alloy plate layer 20 is formed on the base material 10, or the like.

Figure 2A:
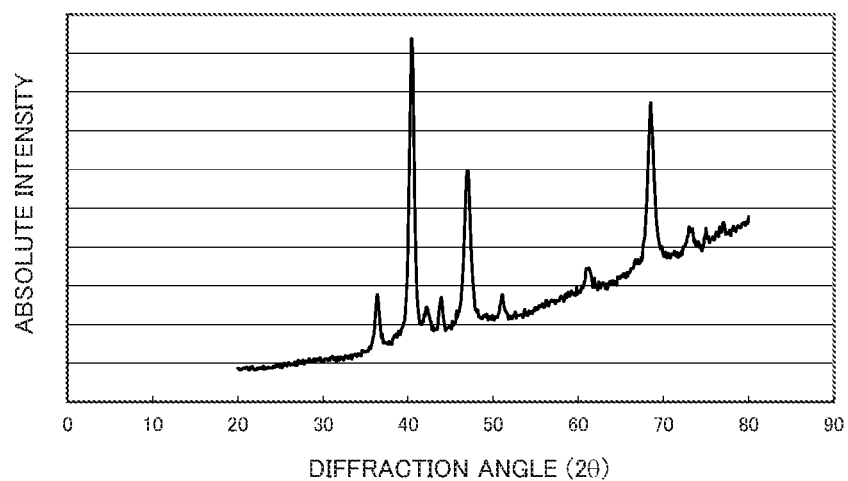
FIG. 2A is a diagram illustrating an example of the diffraction profile obtained by analyzing the crystal structure of Pd by a grazing incidence X-ray diffraction method using an X-ray diffractometer.

Specifically, regarding the amorphous-like structure according to the present embodiment, there may be mentioned an example in which the diffraction profile obtained when the alloy plate layer 20 is analyzed by a grazing incidence X-ray diffraction method using an X-ray diffractometer, has a shape which has no sharp peaks originating from crystals containing at least one element selected from among M1, M2 and M3. That is, in a case in which the alloy plate layer 20 is formed from a Ni—Pd—P alloy, and a crystal containing at least one of Ni, Pd and P exists in the alloy plate layer 20, sharp peaks originating from crystals are detected from the diffraction profile thus obtainable. Meanwhile, in the graph of FIG. 2A obtained by analyzing the Pd crystal structure, peaks originating from Pd crystals are detected at diffraction angles (2θ) near, for example, "40°", "46°", and "68°". In the present embodiment, in a case in which such sharp peaks originating from crystals are not detected in the alloy plate layer 20, it can be determined that the alloy plate layer 20 has an amorphous-like structure.

Figure 2B:
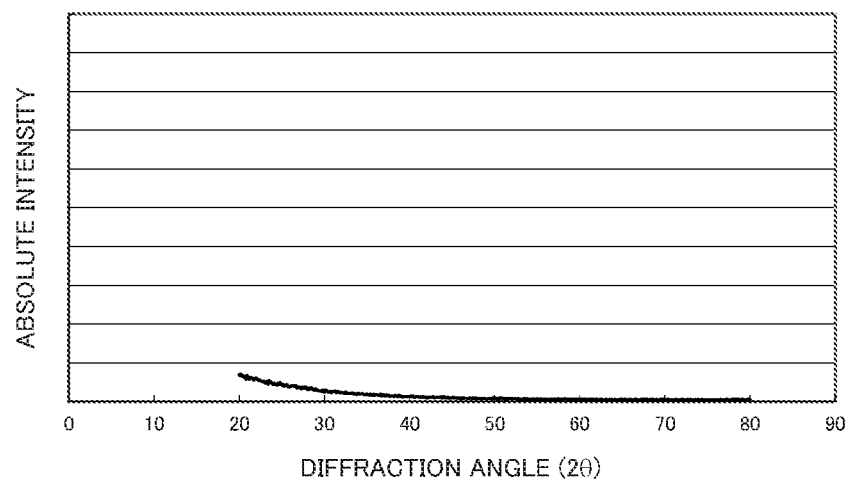
FIG. 2B is a diagram illustrating an example of the diffraction profile obtained by analyzing an amorphous-like alloy plate layer 20 using an X-ray diffractometer.
Figure 2C:
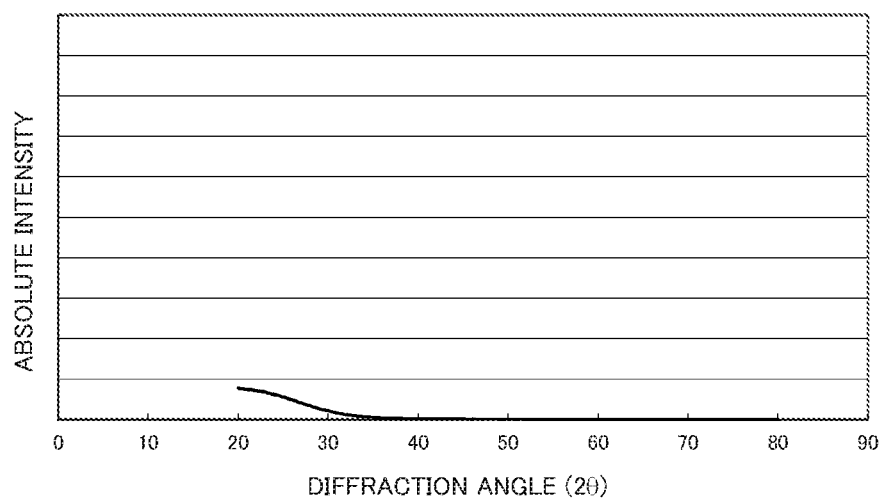
FIG. 2C is a diagram illustrating another example of the diffraction profile obtained by analyzing an amorphous-like alloy plate layer 20 using an X-ray diffractometer.

Alternatively, regarding the amorphous-like structure, there may be mentioned an example in which the diffraction profile obtained when the alloy plate layer 20 is analyzed by a grazing incidence X-ray diffraction method using an X-ray diffractometer, has a shape which has a halo originating from an amorphous structure. That is, in a case in which the alloy plate layer 20 substantially has an amorphous structure, as illustrated in FIGS. 2B and 2C, a halo originating from an amorphous structure (a smooth curve at diffraction angles (2θ) near 20° to 60° is detected from the diffraction profile. Meanwhile, FIG. 2B illustrates the diffraction profile obtained in Example 3 that is described below, and FIG. 2C illustrates the diffraction profile obtained in Example 4 that is described below. These illustrate examples of the diffraction profiles obtainable in a case in which the alloy plate layer 20 is formed from a Ni—Pd—P alloy having an amorphous structure. In the present embodiment, in a case in which such a halo originating from an amorphous structure is exhibited in the alloy plate layer 20, it can be determined that the alloy plate layer 20 has an amorphous-like structure.

In the above description, the case in which the alloy plate layer 20 is formed from a Ni—Pd—P alloy has been illustrated as an example. However, even in a case in which the alloy plate layer 20 is formed from an alloy other than the Ni—Pd—P alloy, similarly, an alloy electroless plating bath obtained by appropriately preparing a plating bath which contains the respective elements of M1, M2 and M3 and has a reducing agent and a complexing agent added thereto, may be used. In this case, it is desirable that the molar ratio between the M1 atom and the M2 atom, M1:M2 (molar ratio), in the alloy electroless plating bath containing the various elements of M1, M2 and M3 has the same value as the proportion Ni:Pd (molar ratio) mentioned above.

Meanwhile, it is preferable that the alloy plate layer 20 is formed using the alloy electroless plating bath described above, under the conditions of a pH of 4.0 to 7.0, a bath temperature of 30° C. to 50° C., and an immersion time of 5 to 20 minutes.

Furthermore, the thickness of the alloy plate layer 20 thus formed is preferably 5 to 100 nm, and more preferably 30 to 50 nm. When the thickness of the alloy plate layer 20 is adjusted to the range described above, the alloy plate coated material 100 thus obtainable can have excellent corrosion resistance and abrasion resistance.

For example, when the alloy plate coated material 100 according to the present embodiment is used as a separator for fuel cells, the base material 10 on which such an alloy plate layer 20 alloy plate layer 20 is to be formed may be preliminarily formed with gas flow channels such as by press working, as described above. According to the present embodiment, the alloy plate layer 20 can be formed on such a base material 10, which is preliminarily formed with gas flow channels, thereby to effectively prevent cracks in the alloy plate layer 20 of the separator for fuel cells to be obtained. This will be described in more detail. When the alloy plate layer 20 is formed on a base material 10 on which gas flow channels are not formed and thereafter the gas flow channels are formed such as by press working, a problem may arise in that cracks occur in the alloy plate layer 20 due to stresses applied when the gas flow channels are formed. However, such a problem can be solved by preliminarily forming the gas flow channels on the base material 10 and thereafter forming the alloy plate layer 20 as described above. In particular, according to the present embodiment, when the alloy plate layer 20 is formed by electroless plating, the alloy plate layer 20 can be uniformly formed for the gas flow channel part having irregularities while suppressing the occurrence of unformed parts of the alloy plate layer 20.

In the present embodiment, the alloy plate layer 20 may be formed directly on the base material 10, but a modifying layer may be provided between the base material 10 and the alloy plate layer 20 in order to enhance the interfacial adhesion property of the alloy plate layer 20. The modifying layer may appropriately be formed in accordance with properties of the base material 10 and the alloy plate layer 20. In view of enhancing the interfacial adhesion property with the alloy plate layer 10, the modifying layer may preferably be a layer that contains the same element or elements as M1 of the M1-M2-M3 alloy which constitutes the alloy plate layer 20. For example, when Ni—Pd—P alloy is employed as the alloy plate layer 20, the modifying layer may preferably be a Ni-based layer that contains Ni as the element represented by M1. When such a Ni-based layer is formed by electroless reduction plating, the Ni-based layer may be a Ni—P plated layer. One modifying layer may be provided, or two or more modifying layers may also be provided. When two or more modifying layers are provided, components that constitute respective layers may be or may not be the same. The method of forming the modifying layer or layers is not particularly limited. The modifying layer or layers can be formed by an appropriate method such as electrolytic plating, electroless plating, and sputtering.

Furthermore, the alloy plate layer 20 of the present embodiment is a plated layer in which the molar ratio of M1 to M2 (M1/M2) is 0.005 to 0.5, as described above.

In the present embodiment, it is preferable that the alloy plate layer 20 is formed from an alloy having an amorphous-like structure, as described above.

Furthermore, the molar ratio of M1 to M2 (M1/M2) in the M1-M2-M3 alloy that constitutes the alloy plate layer 20 is 0.005 to 0.5, preferably 0.008 to 0.44, and more preferably 0.008 to 0.33. When the molar ratio (M1/M2) for the alloy plate layer 20 is adjusted to the range described above, the alloy plate coated material 100 thus obtainable has excellent corrosion resistance and electrical conductivity.

According to the present embodiment, when the alloy plate layer 20 is configured such that the molar ratio of M1 to M2 (M1/M2) is in the range described above, since the alloy plate coated material 100 thus obtainable is non-crystalline, the alloy plate coated material 100 has characteristics such as high strength, high toughness, high corrosion resistance, excellent magnetic characteristics (high magnetic permeability and low coercive force), and excellent molding processability. Furthermore, it is considered that when the molar ratio (M1/M2) is adjusted to an appropriate value, corrosion resistance is enhanced, and electrical conductivity is also enhanced. Thereby, the alloy plate coated material 100 thus obtainable can have excellent electrical conductivity in addition to corrosion resistance.

According to the present embodiment, in regard to the alloy plate layer 20 thus formed, the method for configuring the molar ratio of M1 to M2 (M1/M2) to the range described above is not particularly limited; however, a method of controlling the plating conditions when the alloy plate layer 20 is formed by electroless plating. In this case, regarding the plating conditions for electroless plating, for example, the alloy electroless plating bath described above is used, and the conditions of a pH of 4.0 to 7.0, a bath temperature of 30° C. to 50° C., and an immersion time of 5 to 20 minutes can be used.

Furthermore, it is preferable that the alloy plate layer 20 has a glass transition point. In the present embodiment, when the alloy plate layer 20 has a glass transition point, the corrosion resistance and electrical conductivity of the alloy plate coated material 100 thus obtainable can be further enhanced.

Here, examples of the method of checking whether the alloy plate layer 20 has a glass transition point include known methods such as a method of detecting the temperature when the coefficient of thermal expansion changes rapidly while the temperature of the alloy plate layer 20 is slowly increased or decreased, using a thermomechanical analysis apparatus (TMA); and a method of measuring heat absorption or heat generation while the temperature of the alloy plate layer 20 is slowly increased or decreased, and detecting the temperature at which a shift in the baseline in the DSC curve thus obtainable is observed.

The glass transition point of the alloy plate layer 20 is not particularly limited; however, the glass transition point is preferably 250° C. to 400° C., and more preferably 300° C. to 350° C.

According to the alloy plate coated material 100 related to the present embodiment, the alloy plate layer 20 formed as the outermost layer is formed from a M1-M2-M3 alloy, with the molar ratio of M1 to M2 (M1/M2) being 0.005 to 0.5, and both corrosion resistance and electrical conductivity can be enhanced. Therefore, the alloy plate coated material 100 of the present embodiment is suitably used as an electrical contact material used in connectors, switches, printed wiring boards, and the like.

Meanwhile, regarding the method of producing an alloy plate coated material having an alloy plate layer formed on the surface, a method of forming, on a base material, an amorphous alloy plate layer formed from an amorphous alloy such as a nickel-based alloy has been conventionally used. However, when simply an amorphous alloy plate layer formed from an amorphous alloy is formed, corrosion resistance is enhanced; however, electrical conductivity becomes insufficient. Thus, there is a problem that satisfactory characteristics of an electrical contact material are not obtained.

Particularly, in a case in which the alloy plate coated material is used as a separator for a fuel cell, high electrical conductivity is required in addition to high corrosion resistance. That is, since a separator for a fuel cell is exposed to an environment at a high temperature in an acidic atmosphere in the fuel cell, high corrosion resistance is required. In addition, in order to collect the electrons generated in the electrode, high electrical conductivity is required.

In this regard, according to the alloy plate coated material 100 related to the present embodiment, when the alloy plate layer 20 of a M1-M2-M3 alloy formed as the outermost layer is produced into a plated layer having a molar ratio of M1 to M2 (M1/M2) of 0.005 to 0.5, that is, even if the alloy plate coated material 100 is configured to be non-crystalline (amorphous), when the alloy plate layer 20 is produced into a plated layer having the molar ratio of elements that constitute the M1-M2-M3 alloy controlled to a predetermined value, both corrosion resistance and electrical conductivity can be enhanced. Thus, the alloy plate coated material 100 can be suitably used as a separator for a fuel cell.

Furthermore, according to the alloy plate coated material 100 related to the present embodiment, when the alloy plate layer 20 of the M1-M2-M3 alloy formed as the outermost layer is produced into an alloy plate layer having the amorphous-like structure described above, both corrosion resistance and electrical conductivity can be enhanced. Thus, the alloy plate coated material 100 can be suitably used as a separator for a fuel cell.

EXAMPLES

Hereinafter, the present invention will be more specifically described with reference to examples, but the present invention is not limited to these examples.

Example 1

First, a stainless steel material (SUS316L) was prepared as a base material 10. Next, the base material 10 thus prepared was subjected to an electroless plating treatment under the conditions of 38° C. for 4 minutes using a plating bath obtained by mixing a palladium plating bath and a nickel plating bath such as described below at a proportion of palladium plating bath:nickel plating bath=5.7:1 (volume ratio). Thus, a Ni—Pd—P alloy layer having a thickness of 40 nm was formed as an alloy plate layer 20 on the base material 10, and thereby an alloy plate coated material 100 was obtained. Meanwhile, regarding the palladium salt, reducing agent and complexing agent used in the plating baths, conventionally known compounds were used. Also, the proportion Ni:Pd (molar ratio) in the plating bath obtained by mixing a palladium plating bath and a nickel plating bath was 1.14:1.0.

Palladium Plating Bath

Palladium salt: an amount to make the amount of Pd in the palladium plating bath 0.15 wt %
Reducing agent: 1.8 wt %
Complexing agent: 0.63 wt %
Water: 97.2 wt %
pH: 5.5

Nickel Plating Bath

Nickel salt (nickel chloride): 1.8 wt %
Reducing agent (sodium hypophosphite): 2.4 wt %
Complexing agent: 2.4 wt %
Water: 93.2 wt %
pH: 5.2

Example 2

An alloy plate coated material 100 was obtained in the same manner as in Example 1, except that the conditions for the electroless plating treatment employed at the time of forming the alloy plate layer 20 were changed to 38° C., a duration of 8 minutes, and pH: 6.0, and a Ni—Pd—P alloy layer having a thickness of 80 nm was formed as the alloy plate layer 20 on the base material 10.

Comparative Example 1

An alloy plate coated material 100 was obtained in the same manner as in Example 1, except that as the plating bath used for the electroless plating treatment at the time of forming the alloy plate layer 20, a plating bath obtained by mixing a palladium plating bath and a nickel plating bath at a proportion of palladium plating bath:nickel plating bath=1:2 (volume ratio) was used. Meanwhile, the Ni:Pd (molar ratio) in the plating bath obtained by mixing a palladium plating bath and a nickel plating bath was 0.1:1.0.

Example 3

First, a stainless steel material (SUS316L) was prepared as a base material 10. Then, the base material 10 thus prepared was subjected to electrolytic degreasing in an aqueous alkali solution having a commercially available degreasing agent (manufactured by Nippon Quaker Chemical, Ltd., Formula 618-TK2) dissolved therein. Subsequently, the degreased base material 10 was washed with water, and then was washed with an acid by immersing the base material for 15 seconds in an aqueous solution of sulfuric acid (concentration 25 wt %) at 70° C. Subsequently, the base material was subjected to an electroless plating treatment under the conditions of 37° C. and pH 5.95 for 2 minutes, using a plating bath obtained by mixing a palladium plating bath and a nickel plating bath such as described below at a proportion of palladium plating bath: nickel plating bath=5.67:1.0 (volume ratio). Thus, a Ni—Pd—P alloy layer having a thickness of 40 nm was formed as an alloy plating layer 20 on the base material 10, and an alloy plate coated material 100 was obtained. Furthermore, the proportion Ni:Pd (molar ratio) in the plating bath obtained by mixing a palladium plating bath and a nickel plating bath was 0.88:1.0. Regarding the reducing agent and the complexing agent in the plating bath, conventionally known compounds were used. Furthermore, the molar ratio of M1 (Ni) to M2 (Pd) (Ni/Pd) in the alloy plate layer 20 thus formed was 0.008.

Palladium Plating Bath

Palladium salt (palladium chloride): 0.28 wt %
Reducing agent: 1.80 wt %
Complexing agent: 0.63 wt %
Water: 97.3 wt %
pH: 6.0

Nickel Plating Bath

Nickel salt (nickel sulfate): 2.0 wt %
Reducing agent: 2.6 wt %
Complexing agent: 2.6 wt %
Water: 92.8 wt %
pH: 4.3

Example 4

An alloy plate coated material 100 was obtained in the same manner as in Example 3, except that an electroless plating treatment was applied under the conditions of 37° C. and pH 6.34 for 12 minutes using a plating bath obtained by mixing the palladium plating bath and the nickel plating bath described in Example 3 at a proportion of palladium plating bath:nickel plating bath=3:1 (volume ratio), and thus a Ni—Pd—P alloy layer having a thickness of 40 nm was formed as the alloy plate layer 20 on the base material 10. Furthermore, the proportion Ni:Pd (molar ratio) in the plating bath obtained by mixing a palladium plating bath and a nickel plating bath was 1.88:1.0.

Example 5

An alloy plate coated material 100 was obtained in the same manner as in Example 3, except that an electroless plating treatment was applied under the conditions of 55° C. and pH 6.7 for 5 minutes using a plating bath obtained by mixing the palladium plating bath and the nickel plating bath described in Example 3 at a proportion of palladium plating bath:nickel plating bath=1.86:1.0 (volume ratio), and thereby a Ni—Pd—P alloy layer having a thickness of 40 nm was formed as an alloy plate layer 20 on the base material 10. Furthermore, the proportion Ni:Pd (molar ratio) in the plating bath obtained by mixing a palladium plating bath and a nickel plating bath was 2.68:1.0. Meanwhile, regarding the reducing agent and the complexing agent in the plating bath, conventionally known compounds were used. Furthermore, the molar ratio of M1 (Ni) to M2 (Pd) (Ni/Pd) in the alloy plate layer 20 thus formed was 0.44.

Measurement of Amounts of Metals in Alloy Plate Layer 20

The amounts of metals in the film were measured using the alloy plate coated materials 100 obtained in Examples 3 and 5. Specifically, each of the alloy plate coated materials 100 was cut into a size of the alloy plate film 20 of 40 mm in length and 40 mm in width, and the alloy plate film 20 was dissolved by immersing the film in a 60% aqueous solution of nitric acid (volume 10 ml) at 60° C. The alloy plate coated material 100 was removed, and water was added to the aqueous solution in which the alloy plate film 20 was dissolved, to make up 100 ml. Subsequently, the mass concentrations (g/L) of the ions (Ni, Pd and P) eluted into the aqueous solution were measured using an inductively coupled plasma emission analyzer (manufactured by Shimadzu Corporation, ICPE-9000), and the molar ratio in the film was calculated from the measurement results, the amounts of metals obtained from the measurement results of ICP thus obtained, and the surface area of the dissolved plated layer. The results are presented in Table 1.

TABLE 1

| | Molar ratio in alloy plate layer 20 (Ni/Pd) | Contact resistance [mW × cm$^2$] |
|---|---|---|
| Example 3 | 0.008 | 0.5 |
| Example 4 | Not measured | 0.43 |
| Example 5 | 0.44 | 0.69 |
| Comparative Example 2 | Alloy plate layer 20 is absent | 10.9 |
| Comparative Example 3 | Not measured | 0.74 |

Comparative Example 2

The stainless steel material (SUS316L) used in Example 3 described above was prepared, and the following evaluation was carried out without forming an alloy plate layer 20 on this stainless steel material.

Comparative Example 3

An alloy plate coated material 100 was obtained in the same manner as in Example 3, except that an electroless plating treatment was applied under the conditions of 55° C. and pH 7.3 for 5 minutes using a plating bath obtained by mixing the palladium plating bath and the nickel plating bath described in Example 3 at a proportion of palladium plating bath:nickel plating bath=1:1 (volume ratio), and thus a Ni—Pd—P alloy layer having a thickness of 40 nm was formed as an alloy plate layer 20 on the base material 10. Meanwhile, regarding the palladium salt, the reducing agent and the complexing agent in the plating bath, conventionally known compounds were used. Furthermore, the proportion Ni:Pd (molar ratio) in the plating bath obtained by mixing a palladium plating bath and a nickel plating bath was 4.99:1.0.

Analysis of Alloy Plate Layer 20 Using X-Ray Diffractometer

For the alloy plate coated materials 100 obtained in Examples 3 and 4 and Comparative Examples 2 and 3, an X-ray diffraction analysis was carried out by a grazing incidence X-ray diffraction method using an X-ray diffractometer (manufactured by Rigaku Corporation, product No.: RINT-2500). Meanwhile, the analysis results of Example 3 are illustrated in FIG. 2B, and the analysis results of Example 4 are illustrated in FIG. 2C. According to the results, in Example 3, peaks originating from crystals were not observed at the positions at which peaks of M1 to M3 metals appear, and in Comparative Example 2, peaks that were considered to be originating from the crystals in the base material were observed.

Evaluation of Corrosion Resistance (Part 1 Thereof)

Next, for the alloy plate coated materials 100 obtained in Example 1 and Comparative Example 1, an evaluation of the corrosion resistance was carried out. Specifically, each of the alloy plate coated materials 100 was masked along the edge faces with a polyimide tape so that an area which measured 35 mm in length and 20 mm in width was exposed, and the alloy plate coated material was immersed in an aqueous solution of sulfuric acid (volume 80 ml, pH: 1.0) at 90° C. for 100 hours. Subsequently, the alloy plate coated material 100 was removed, and the mass concentrations (g/L) of the ions (Ni, Pd, P, Fe, Cr and Mo) eluted from the alloy plate coated material 100 into the aqueous solution of sulfuric acid were measured using an inductively coupled plasma emission analyzer (manufactured by Shimadzu Corporation, ICPE-9000). Furthermore, as a comparison, an evaluation of corrosion resistance was carried out also for Comparative Example 2 which was a stainless steel material (SUS316L) conventionally used as a material for a separator for a fuel cell, by similarly immersing the stainless steel material in an aqueous solution of sulfuric acid, and measuring the mass concentrations (g/L) of the ions (Ni, Pd, P, Fe, Cr and Mo) eluted into the aqueous solution of sulfuric acid. The results are presented in FIG. 3A. Meanwhile, the graph of FIG. 3A shows the values of the ion elution concentration (ppm).

Figure 3A:
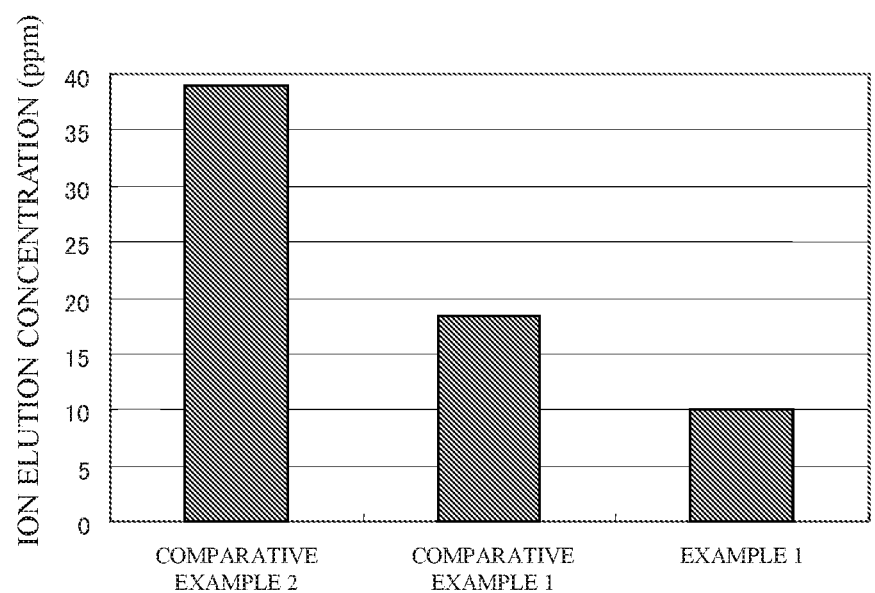
FIG. 3A is a graph (part 1 thereof) illustrating the results of evaluating the corrosion resistance of an alloy plate coated material 100 obtained in an Example.

According to the results of FIG. 3A, 10 ppm of metals was eluted in Example 1. On the other hand, in SUS316L (Comparative Example 2) that is used as a material for a conventional separator for a fuel cell or the like, 39 ppm of metals was eluted. In Example 1, elution of ions from the base material could be effectively suppressed as compared to Comparative Example 2, and it was confirmed that the material exhibited excellent corrosion resistance. Furthermore, although it is not shown in FIG. 3A, elution of ions from the base material could also be effectively suppressed in Example 2 to the same extent as the extent of Example 1, and it was confirmed that the material exhibited excellent corrosion resistance. On the other hand, according to the results of FIG. 3A, in Comparative Example 1, 18 ppm of metals was eluted, and the amount of elution of ions from the base material was larger compared to Example 1, and it was confirmed that the material exhibited poor corrosion resistance.

Evaluation of Corrosion Resistance (Part 2 Thereof)

Figure 3B:
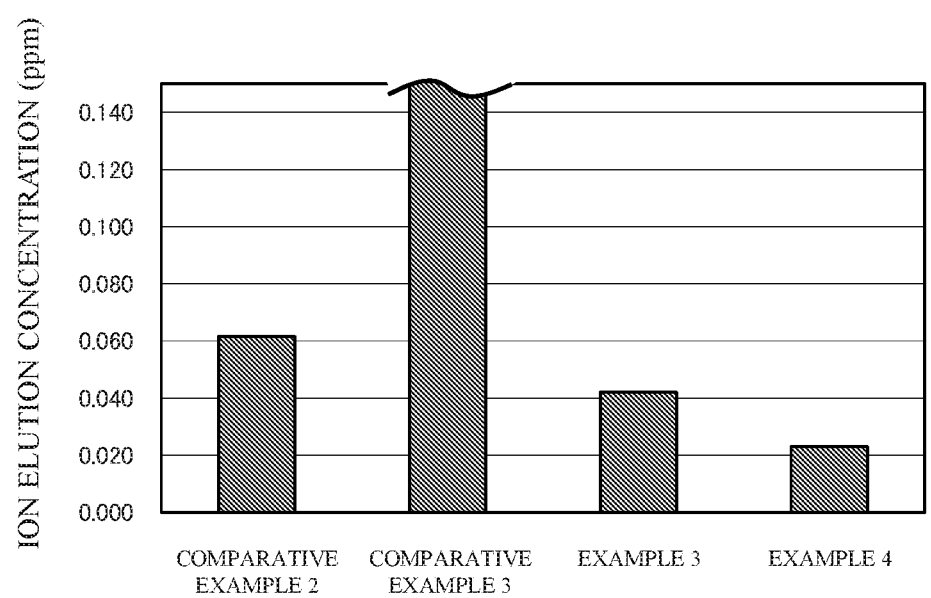
FIG. 3B is a graph (part 2 thereof) illustrating the results of evaluating the corrosion resistance of an alloy plate coated material 100 obtained in an Example.

Subsequently, for the alloy plate coated materials 100 obtained in Examples 3 and 4 and Comparative Example 3, an evaluation of corrosion resistance was carried out. For Example 3, specifically, the alloy plate coated material 100 was masked along the edge faces with a polyimide tape so that an area which measured 40 mm in length and 37 mm in width was exposed, and the alloy plate coated material was immersed in an aqueous solution of sulfuric acid (volume 90 ml, pH: 3.0) at 90° C. for 100 hours. Subsequently, the alloy plate coated material 100 was removed, and the mass concentrations (g/L) of the ions (Ni, Pd, P, Fe, Cr and Mo) eluted from the alloy plate coated material 100 into the aqueous solution of sulfuric acid were measured using an inductively coupled plasma emission analyzer (manufactured by Shimadzu Corporation, ICPE-9000). Furthermore, as a comparison, an evaluation of corrosion resistance was also carried out for Comparative Example 2 which was a stainless steel material (SUS316L) conventionally used as a material for a separator for a fuel cell, by similarly immersing the stainless steel material in an aqueous solution of sulfuric acid and measuring the mass concentrations (g/L) of the ions (Ni, Pd, P, Fe, Cr and Mo) eluted into the aqueous solution of sulfuric acid. The results are presented in FIG. 3B. In addition, the graph of FIG. 3B shows the values of the ion elution concentration (ppm). In regard to the evaluation of corrosion resistance (part 2 thereof) and the evaluation of corrosion resistance (part 3 thereof) that will be described below, since the pH of the sulfuric acid used in the test was higher (changed from 1.0 to 3.0) compared to the evaluation of corrosion resistance (part 1 thereof) described above, the values of the ion elution concentration (ppm) were relatively lower values.

According to the results of FIG. 3B, 0.062 ppm of metals was eluted in Comparative Example 2, and 2.219 ppm of metals was eluted in Comparative Example 3. 0.042 ppm of metals was eluted in Example 3, and 0.023 ppm of metals was eluted in Example 4.

It was confirmed from the results of Table 1 and FIG. 3B that in Example 3 in which an alloy plate layer 20 having a molar ratio of M1 (Ni) to M2 (Pd) (Ni/Pd) of 0.005 to 0.5 was formed on a base material 10, elution of ions from the base material could be effectively suppressed as compared to SUS316L (Comparative Example 2) that is used as a material for a conventional separator for a fuel cell or the like, and Example 3 exhibited excellent corrosion resistance. On the other hand, it was confirmed from the results of FIG. 3B that in Comparative Example 3, the amount of elution of ions from the base material was larger compared to the amounts of Example 3 and Example 4, and Comparative Example 3 exhibited poor corrosion resistance.

Evaluation of Corrosion Resistance (Part 3 Thereof)

Subsequently, an evaluation of corrosion resistance was carried out for the alloy plate coated materials 100 obtained in Example 5 and Comparative Example 2. Specifically, each of the alloy plate coated materials 100 was masked along the edge faces with a polyimide tape so that an area which measured 40 mm in length and 37 mm in width was exposed, and the alloy plate coated material was immersed in an aqueous solution of sulfuric acid (volume 90 ml, pH: 3.0) at 90° C. for 100 hours. Subsequently, the alloy plate coated material 100 was removed, and the mass concentrations (g/L) of the ions (Ni, Pd, P, Fe, Cr and Mo) eluted from the alloy plate coated material 100 into the aqueous solution of sulfuric acid were measured using an inductively coupled plasma emission analyzer (manufactured by Shimadzu Corporation, ICPE-9000). Furthermore, as a comparison, an evaluation of corrosion resistance was also carried out for Comparative Example 2 which was a stainless steel material (SUS316L) conventionally used as a material for a separator for a fuel cell, by similarly immersing the stainless steel material in an aqueous solution of sulfuric acid and measuring the mass concentrations (g/L) of the ions (Ni, Pd, P, Fe, Cr and Mo) eluted into the aqueous solution of sulfuric acid. The results are presented in FIG. 3C. In addition, the graph of FIG. 3C shows the values of the ion elution concentration (ppm).

Figure 3C:
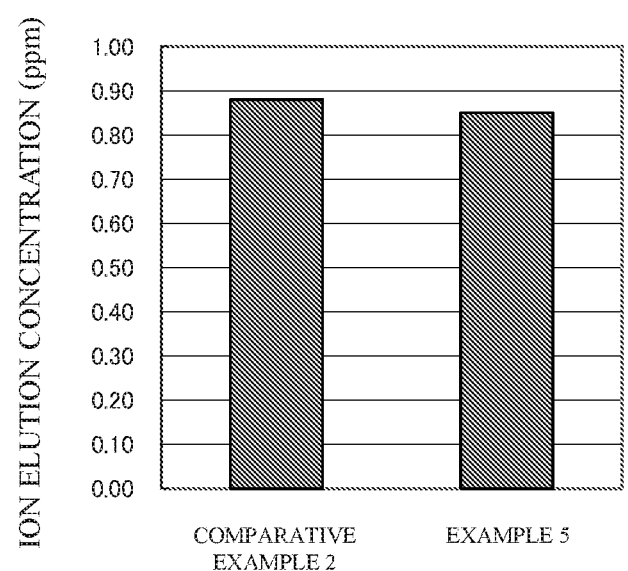
FIG. 3C is a graph (part 3 thereof) illustrating the results of evaluating the corrosion resistance of an alloy plate coated material 100 obtained in an Example.

According to the results of FIG. 3C, 0.88 ppm of metals was eluted in Comparative Example 2, and 0.85 ppm of metals was eluted in Example 5.

From the results of Table 1 and FIG. 3C, it was confirmed that in Example 5 in which an alloy plate layer 20 having a molar ratio of M1 (Ni) to M2 (Pd) (Ni/Pd) of 0.005 to 0.5 was formed on the base material 10, elution of ions from the base material could be effectively suppressed as compared to SUS316L (Comparative Example 2) that is used as a material for a conventional separator for a fuel cell or the like, and excellent corrosion resistance was obtained.

Measurement of Contact Resistance Value (Part 1)

Figure 4:
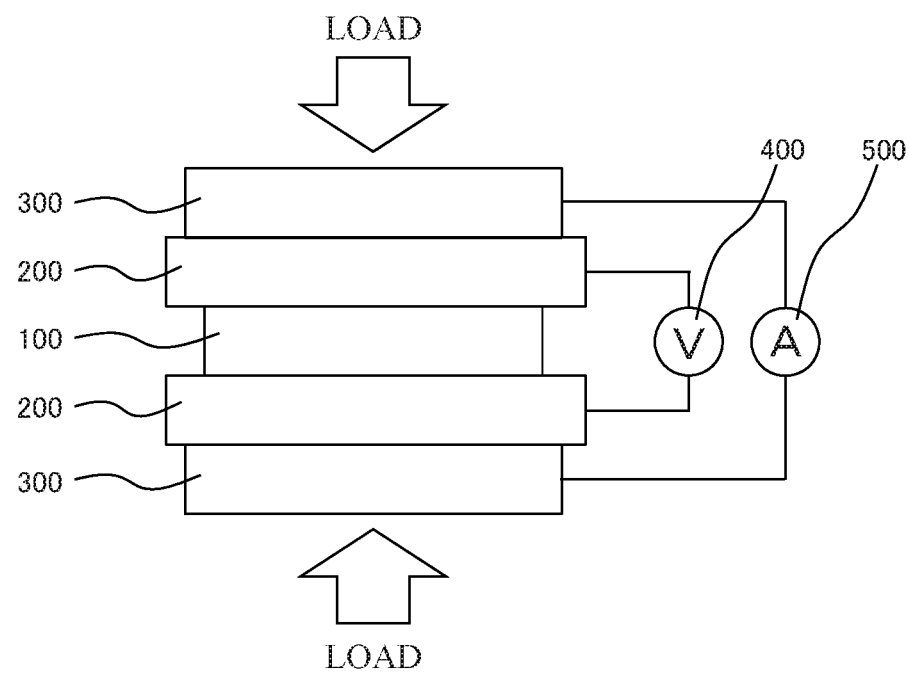
FIG. 4 is a diagram for explaining the method for measuring the contact resistance of an alloy plate coated material 100 obtained in an Example.

Each of the alloy plate coated materials 100 obtained in Example 1 was used to form a measurement system as shown in FIG. 4, and measurement of the contact resistance value was performed using the measurement system formed. The measurement system shown in FIG. 4 is configured of: the alloy plate coated material 100; carbon cloths 200, which are used as base materials of gas diffusion layers in a separator for fuel cells; gold plate coated copper electrodes 300; a digital multimeters 400; and an ammeter 500. Specifically, at the time of measurement of the contact resistance value, the alloy plate coated material 100 was first worked into a size of width of 20 mm, length of 20 mm and thickness of 1.27 mm and fixed by being interposed between the gold plate coated copper electrodes 300 via the carbon cloths 200 (part number: TGP-H-090, available from Toray Industries, Inc), and the measurement system was thus formed as shown in FIG. 4. Then, the contact resistance values between the upper and lower carbon cloths 200 sandwiching the test piece were measured using an ohm meter (Milli-Ohm HiTESTER 3540 available from HIOKI E.E. CORPORATION) within a range of load of 5 to 20 (kg/cm2) while applying a constant load to the copper electrodes 300. Measurement results are shown in FIG. 5.

Figure 5:
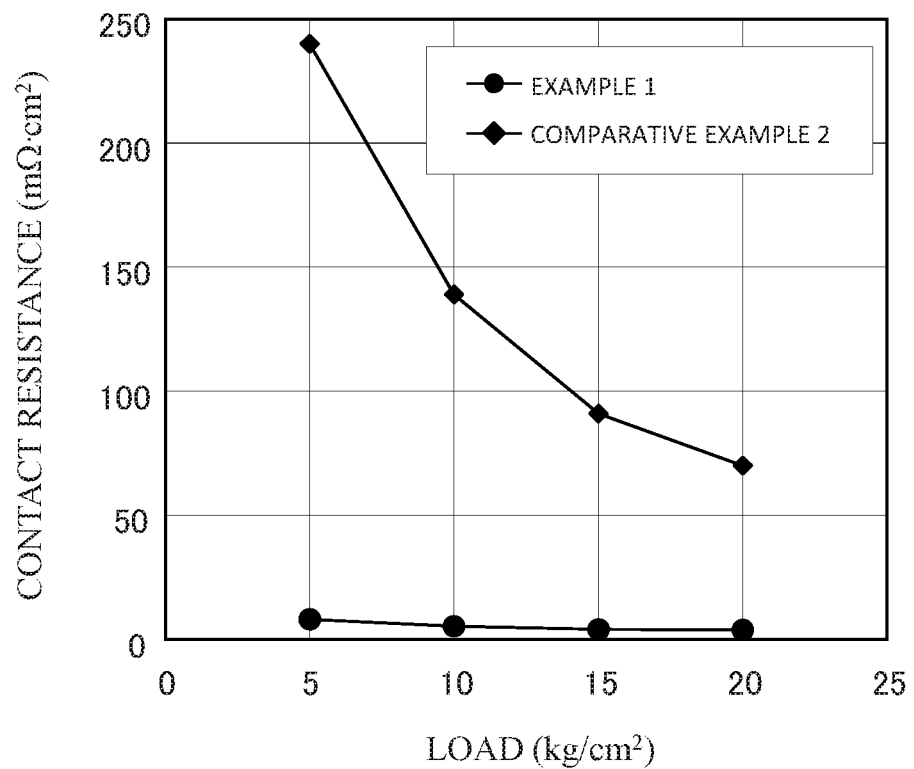
FIG. 5 is a graph illustrating the results of measuring the contact resistance of an alloy plate coated material 100 obtained in an Example.

FIG. 5 also shows values of the measured contact resistance values of SUS316L (Comparative Example 2) as comparative data. The contact resistance values of SUS316L (Comparative Example 2) were obtained by performing measurement in the above-described measurement system as shown in FIG. 4 after working SUS316L into a size of width of 20 mm, length of 20 mm and thickness of 1.0 mm.

According to the results of FIG. 5, in Example 1, the contact resistance had a lower value compared to SUS316L (Comparative Example 2) that is used as a material for a separator for a fuel cell or the like, and consequently, excellent electrical conductivity was obtained.

Measurement of Contact Resistance Value (Part 2)

Next, alloy plate coated materials 100 were processed into a size of 20 mm in width, 20 mm in length, and 1.27 mm in thickness using the alloy plate coated materials 100 obtained in Examples 3 to 5 and Comparative Examples 2 and 3, and using a measurement system produced by eliminating the carbon cloth 200 from the measurement system illustrated in FIG. 4. For these alloy plate coated materials 100, the contact resistance values between upper and lower copper electrodes 300 that sandwiched a test piece therebetween, were measured under a load of 1 MPa (10.2 (kg/cm$^2$)) using an ohm meter (manufactured by Hioki E.E. Corporation, MILLI-OHM HITESTER 3540). The measurement results are presented in Table 1.

According to the results of Table 1, in Examples 3 and 5 in which an alloy plate layer 20 having a molar ratio of M1 (Ni) to M2 (Pd) (Ni/Pd) of 0.005 to 0.5 was formed on a base material 10, the contact resistance had a lower value compared to SUS316L (Comparative Example 2) that is used as a material for a conventional separator for a fuel cell or the like, and excellent electrical conductivity was obtained. On the other hand, according to the results of Table 1, in Comparative Example 3 in which the molar ratio of M1 (Ni) to M2 (Pd) (Ni/Pd) for the alloy plate layer 20 was not in the range of 0.005 to 0.5, the contact resistance value was slightly higher compared to Examples 3 and 5, and consequently, slightly poor electrical conductivity was obtained.

Next, Examples of analyzing the surface state of the stainless steel materials and evaluating the plating properties and adhesiveness are described below.

Example 6

First, a stainless steel material (SUS316L) was prepared as a base material 10. Subsequently, the base material 10 thus prepared was immersed in an aqueous solution of sulfuric acid having a sulfuric acid concentration of 25 vol % under the conditions of a temperature of 70° C. and an immersion time of 5 seconds, and thereby a stainless steel sheet having a passivation film formed on the surface was obtained.

Example 7

A stainless steel sheet having a passivation film formed on the surface was obtained in the same manner as in Example 6, except that the base material 10 thus prepared was immersed in an aqueous solution of sulfuric acid having a sulfuric acid concentration of 25 vol % under the conditions of a temperature of 70° C. and an immersion time of 10 seconds.

Example 8

A stainless steel sheet having a passivation film formed on the surface was obtained in the same manner as in Example 6, except that the base material 10 thus prepared was immersed in an aqueous solution of sulfuric acid having a sulfuric acid concentration of 25 vol % under the conditions of a temperature of 70° C. and an immersion time of 15 seconds.

Example 9

A stainless steel sheet having a passivation film formed on the surface was obtained in the same manner as in Example 6, except that the base material 10 thus prepared was immersed in an aqueous solution of sulfuric acid having a sulfuric acid concentration of 25 vol % under the conditions of a temperature of 70° C. and an immersion time of 20 seconds.

Then, for each of Examples 6 to 9 of stainless steel sheets having such passivation films formed thereon, the amounts of Cr, O and Fe in at % were measured from 5 sites using a scan type Auger electron spectroscopy analyzer (AES) (manufactured by JEOL, Ltd., product No.: JAMP-9500F), and the results thus obtained were averaged. Thereby, the Cr/O value (at % of Cr/at % of O) and the Cr/Fe value (at % of Cr/at % of Fe) were determined. The results are presented in Table 2.

Subsequently, for each of Examples 6 to 9 of the stainless steel sheets having passivation films formed thereon, a Ni—Pd—P alloy layer was formed on the passivation film in the same manner as in Example 3 as described above, and thus an alloy plate coated material 100 was obtained.

Then, for the alloy plate coated materials 100 obtained as such, an evaluation of the plating properties of the Ni—Pd—P alloy layers was carried out. Specifically, the surface of each of the alloy plate coated materials 100 was analyzed using a fluorescent X-ray analyzer (manufactured by Rigaku Corporation, product No.: ZSX100e), and the presence or absence of the Ni—Pd—P alloy was determined. In a case in which the Ni—Pd—P alloy was detected, it was considered that a Ni—Pd—P alloy layer was satisfactorily formed, and thus an evaluation of the plating properties was carried out. The results are presented in Table 2. Consequently, in the alloy plate coated materials 100 of Examples 6 to 9, the Ni—Pd—P alloy was detected from the surface, and it was confirmed that a Ni—Pd—P alloy layer was satisfactorily formed.

Furthermore, for the alloy plate coated materials 100 of Examples 6 to 9, an evaluation of the adhesiveness of the Ni—Pd—P alloy layer was carried out. Specifically, a peeling test was carried out by adhering an adhesive tape (manufactured by Nichiban Co., Ltd., NICETACK powerful type) to the Ni—Pd—P alloy layer of each of the alloy plate coated materials 100, and then detaching the adhesive tape. Thereafter, the detachment state of the Ni—Pd—P alloy layer was observed, and in a case in which detachment was not recognized, it was considered that the adhesiveness of the Ni—Pd—P alloy layer was satisfactory. Thus, an evaluation of adhesiveness was carried out. The results are presented in Table 2. Consequently, for the alloy plate coated materials 100 of Examples 6 to 9, detachment of the Ni—Pd—P alloy layer was not recognized, and it was confirmed that the Ni—Pd—P alloy layer had satisfactory adhesiveness.

TABLE 2

| | Kind of acid | Concentration [vol %] | Temperature [° C.] | Immersion time [sec] | Passivation film | | NiPdP plate layer | |
|---|---|---|---|---|---|---|---|---|
| | | | | | Cr/O value | Cr/Fe value | Plating properties | Adhesiveness |
| Example 6 | Sulfuric acid | 25 | 70 | 5 | 0.1987 | 0.7918 | good | good |
| Example 7 | | | | 10 | 0.1833 | 0.6175 | good | good |
| Example 8 | | | | 15 | 0.1264 | 0.5631 | good | good |
| Example 9 | | | | 20 | 0.092 | 0.5577 | good | good |

From the results of Table 2, in regard to Examples 6 to 9 in which a passivation film having a Cr/O value in the range of 0.09 to 0.20 and a Cr/Fe value in the range of 0.55 to 0.80 at the surface as measured by an Auger electron spectroscopy analysis, was formed on a stainless steel sheet as the base material 10, it was confirmed that the Ni—Pd—P alloy layer formed on the passivation film had excellent plating properties and adhesiveness. Meanwhile, Table 2 shows results with a Cr/O value of 0.092 to 0.1987 and a Cr/Fe value of 0.5577 to 0.7918 for the passivation film of the stainless steel sheet. However, in consideration of the errors of the analysis results of an Auger electron spectroscopy analysis, it is considered that when a passivation film having a Cr/O value in the range of 0.09 to 0.20 and a Cr/Fe value in the range of 0.55 to 0.80 at the surface as measured by an Auger electron spectroscopy analysis is formed on a stainless steel sheet, the Ni—Pd—P alloy layer formed on the passivation film has excellent plating properties and adhesiveness.

100 . . . Alloy plate coated material
10 . . . Base material
20 . . . Alloy plate layer

What is claimed is:

1. An alloy plate coated material comprising:
   a stainless steel sheet which has a passivation film having a Cr/O value (molar ratio of Cr/O) in the range of 0.09 to 0.20 and a Cr/Fe value (molar ratio of Cr/Fe) in the range of 0.55 to 0.80 at the surface as measured by an Auger electron spectroscopy analysis on the stainless steel sheet; and
   an alloy plate layer formed on the passivation film of the stainless steel sheet and formed from a M1-M2-M3 alloy,
   wherein in the M1-M2-M3 alloy, M1 is at least one element selected from Ni, Fe, Co, Cu, Zn and Sn; M2 is at least one element selected from Pd, Re, Rh, Ag and Ru; and M3 is at least one element selected from P and B, and
   the alloy plate layer has a molar ratio of M1 to M2 (M1/M2) of 0.005 to 0.5.

2. The alloy plate coated material according to claim 1, wherein the alloy plate layer has a glass transition point.

3. The alloy plate coated material according to claim 1, wherein the alloy plate layer has a structure which contains an amorphous portion of the M1-M2-M3 alloy.

4. The alloy plate coated material according to claim 1, wherein in regard to the alloy plate layer, the diffraction profile analyzed by a grazing incidence X-ray diffraction method using an X-ray diffractometer, has a shape which has a halo originating from an amorphous structure.

5. The alloy plate coated material according to claim 1, wherein a ratio of each element in the M1-M2-M3 alloy is that M1 is 20 to 50 at %, M2 is 30 to 50 at %, and M3 is 20 to 30 at %.

6. The alloy plate coated material according to claim 1, further comprising a modifying layer between the stainless steel sheet and the alloy plate layer to enhance the interfacial adhesion property between the stainless steel sheet and the alloy plate layer.

7. The alloy plate coated material according to claim 1, wherein the alloy plate layer is formed from a Ni—Pd—P alloy.

* * * * *